United States Patent
Santhar et al.

(10) Patent No.: US 12,555,608 B2
(45) Date of Patent: Feb. 17, 2026

(54) QUERY-BASED SYNTHESIS OF A CONTEXTUAL VIDEO FRAME SUMMARY THROUGH PARTIAL ATTENTION

(71) Applicant: INTERNATIONAL BUSINESS MACHINES CORPORATION, Armonk, NY (US)

(72) Inventors: Sathya Santhar, Ramapuram (IN); Sarbajit K. Rakshit, Kolkata (IN); Sridevi Kannan, Chennai (IN); Samuel Mathew Jawaharlal, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 98 days.

(21) Appl. No.: 18/437,644

(22) Filed: Feb. 9, 2024

(65) Prior Publication Data
US 2025/0259652 A1 Aug. 14, 2025

(51) Int. Cl.
*G11B 27/031* (2006.01)
(52) U.S. Cl.
CPC ................... *G11B 27/031* (2013.01)
(58) Field of Classification Search
CPC ........................................... G11B 27/031
USPC ........................................ 386/285
See application file for complete search history.

(56) References Cited

U.S. PATENT DOCUMENTS

| | | |
|---|---|---|
| 2017/0242554 A1 | 8/2017 | Nanjunda Iyer |
| 2020/0320308 A1* | 10/2020 | Marks ................. G06V 20/62 |
| 2020/0327160 A1* | 10/2020 | Hsieh ............... H04N 21/26603 |
| 2023/0325611 A1* | 10/2023 | Garg ...................... G06F 40/58 |
| 2024/0267601 A1* | 8/2024 | Lemieux ............... G06F 16/739 |
| 2025/0159276 A1* | 5/2025 | Doken ............... H04N 21/4725 |

OTHER PUBLICATIONS

Chen, et al., "Video to Text Summary: Joint Video Summarization and Captioning with Recurrent Neural Networks", British Machine Vision, 2017, 15 Pages.
Dilawari, et al., "ASoVS: Abstractive Summarization of Video Sequences", IEEE Access, vol. 7, Mar. 11, 2019, pp. 29253-29263.
(Continued)

*Primary Examiner* — Loi H Tran
(74) *Attorney, Agent, or Firm* — Robert R. Aragona

(57) ABSTRACT

An embodiment for query-based synthesis of a contextual video frame summary through partial attention is provided. The embodiment may include receiving a video from a repository and a query from a user. The embodiment may also include obtaining one or more captions for the video. The embodiment may further include identifying one or more relevant frames in the video and one or more relevant captions. The embodiment may also include in response to determining the one or more relevant frames and the one or more relevant captions are capable of being stitched together, stitching the one or more relevant frames and the one or more relevant captions together. The embodiment may further include generating an abstractive text summary of the stitched one or more relevant captions. The embodiment may also include converting the abstractive text summary into audio. The embodiment may further include generating a new summarized video.

20 Claims, 3 Drawing Sheets

(56) References Cited

OTHER PUBLICATIONS

Ejaz, et al., "Multi-scale contrast and relative motion-based key frame extraction", EURASIP Journal on Image and Video Processing, 2018, 11 Pages.
Huang, et al., "Query-controllable Video Summarization", arXiv:2004.03661v1 [cs.IR] Apr. 7, 2020, 10 Pages.
Ji, et al., "Video Summarization with Attention-Based Encoder-Decoder Networks", arXiv:1708.09545v2 [cs.CV] Apr. 16, 2018, 9 pages.
Sah, et al., "Semantic Text Summarization of Long Videos", 2017 IEEE Winter Conference on Applications of Computer Vision, 9 Pages.
Yi, et al., "Semantic Video Indexing and Summarization Using Subtitles", ResearchGate, Nov. 2004, 9 Pages.
Zhang, et al., "Deep Reinforcement Learning for Query-Conditioned Video Summarization", Applied Sciences, Feb. 21, 2019, 16 pages.
Zhang, et al., "Query-Conditioned Three-Player Adversarial Network for Video Summarization", arXiv:1807.06677v1 [cs. CV] Jul. 17, 2018, 13 pages.

\* cited by examiner

QUERY-BASED SYNTHESIS OF A CONTEXTUAL VIDEO FRAME SUMMARY THROUGH PARTIAL ATTENTION

BACKGROUND

The present invention relates generally to the field of computing, and more particularly to a system for query-based synthesis of a contextual video frame summary through partial attention.

The size of multimedia databases has continued to increase in recent years. As the size of these databases increase, it becomes more important to develop methods for efficient and effective management and analysis of such data. Every company, including small private firms and large publicly traded enterprises, has processes that keep the business operational. For businesses to survive in more competitive markets, it becomes valuable to automate manual tasks to increase productivity. Additionally, customers of these businesses may ask different questions or raise different issues to these businesses. The businesses may rely on video repositories to address these questions and issues.

SUMMARY

According to one embodiment, a method, computer system, and computer program product for query-based synthesis of a contextual video frame summary through partial attention is provided. The embodiment may include receiving a video from a repository and a query from a user. The embodiment may also include obtaining one or more captions for the video. The embodiment may further include identifying one or more relevant frames in the video and one or more relevant captions corresponding to the one or more relevant frames based on the query. The embodiment may also include in response to determining the one or more relevant frames and the one or more relevant captions are capable of being stitched together, stitching the one or more relevant frames and the one or more relevant captions together. The embodiment may further include generating an abstractive text summary of the stitched one or more relevant captions. The embodiment may also include converting the abstractive text summary into audio. The embodiment may further include generating a new summarized video by synchronizing the audio with the stitched one or more relevant frames.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
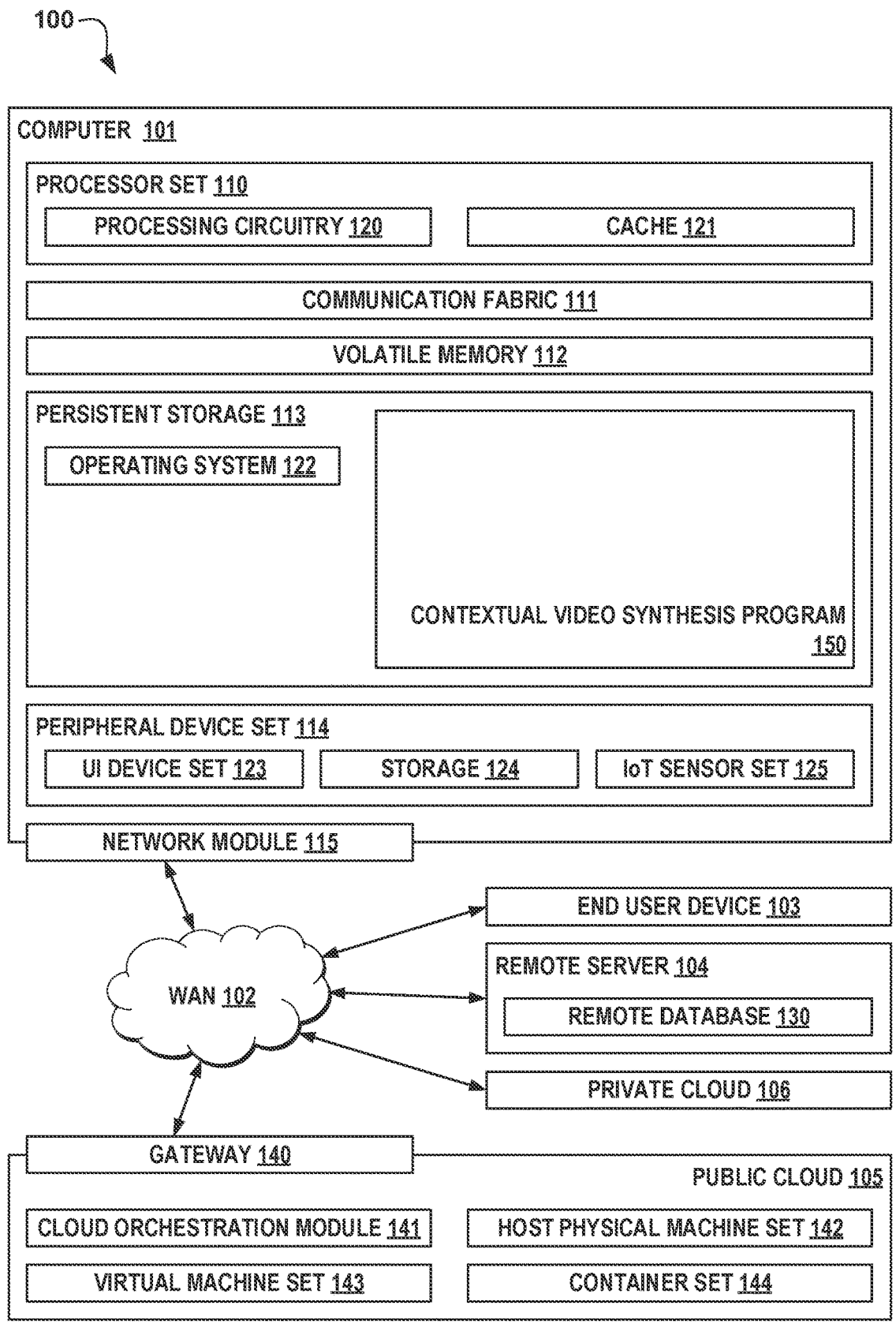
FIG. 1 illustrates an exemplary computing environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for query-based synthesis of a contextual video frame summary through partial attention. The following described exemplary embodiments provide a system, method, and program product to, among other things, identify one or more relevant frames in a video and one or more captions corresponding to the one or more relevant frames based on a query and one or more captions and, accordingly, generate a new summarized video by synchronizing audio with stitched one or more relevant frames. Therefore, the present embodiment has the capacity to improve computer vision and video processing technology by automating the video summary synthesis in accordance with a query context.

As previously described, the size of multimedia databases has continued to increase in recent years. As the size of these databases increase, it becomes more important to develop methods for efficient and effective management and analysis of such data. Every company, including small private firms and large publicly traded enterprises, has processes that keep the business operational. For businesses to survive in more competitive markets, it becomes valuable to automate manual tasks to increase productivity. Additionally, customers of these businesses may ask different questions or raise different issues to these businesses. The businesses may rely on video repositories to address these questions and issues. The large amount of video data is often difficult to review and navigate, particularly for long videos. This problem is typically addressed by identifying interesting segments from long videos using image quality. However, merely identifying interesting segments fails to identify relevant frames of the video and contextually summarize the video based on a user query.

It may therefore be imperative to have a system in place to summarize lengthy videos into shorter versions without losing the contextual meaning of the summarized content. Thus, embodiments of the present invention may provide advantages including, but not limited to, automating the video summary synthesis in accordance with a query context, summarizing lengthy videos into shorter versions without losing the contextual meaning of the summarized content, and reducing resource utilization costs. The present invention does not require that all advantages need to be incorporated into every embodiment of the invention.

According to at least one embodiment, when searching for information, a video from a repository and a query from a user may be received in order to obtain one or more captions for the video. Upon obtaining the one or more captions, one or more relevant frames in the video and one or more relevant captions corresponding to the one or more relevant frames may be identified based on the query so that it may be determined whether the one or more relevant frames and the one or more relevant captions are capable of being stitched together. According to at least one embodiment, in response to determining the one or more relevant frames and the one or more relevant captions are capable of being stitched together, the one or more relevant frames and the one or more relevant captions may be stitched together.

According to at least one other embodiment, in response to determining the one or more relevant frames and the one or more relevant captions are not capable of being stitched together, at least one relevant frame and at least one relevant caption that are not capable of being stitched together may be discarded such that the one or more relevant frames and the one or more relevant captions may be stitched together while omitting the discarded at least one relevant frame and the discarded at least one relevant caption. In either embodiment, an abstractive text summary of the stitched one or more relevant captions may be generated in order to convert the abstractive text summary into audio. Then, a new summarized video may be generated by synchronizing the audio with the stitched one or more relevant frames.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to identify one or more relevant frames in a video and one or more captions corresponding to the one or more relevant frames based on a query and one or more captions and, accordingly, generate a new summarized video by synchronizing audio with stitched one or more relevant frames.

Referring to FIG. 1, an exemplary computing environment 100 is depicted, according to at least one embodiment. Computing environment 100 contains an example of an environment for the execution of at least some of the computer code involved in performing the inventive methods, such as a contextual video synthesis program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage 113 allows writing of data, deletion of data and re-writing of data. Some familiar forms of persistent storage 113 include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices 114 and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments the private cloud 106 may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the contextual video synthesis program 150 may be a program capable of receiving a video from a repository and a query from a user, identifying one or more relevant frames in the video and one or more captions corresponding to the one or more relevant frames based on the query and one or more captions, generating a new summarized video by synchronizing audio with stitched one or more relevant frames, automating the video summary synthesis in accordance with a query context, summarizing lengthy videos into shorter versions without losing the contextual meaning of the summarized content, and reducing resource utilization costs. Furthermore, notwithstanding depiction in computer 101, the contextual video synthesis program 150 may be stored in and/or executed by, individually or in any combination, end user device 103, remote server 104, public cloud 105, and private cloud 106. The contextual video synthesis method is explained in further detail below with respect to FIGS. 2A and 2B. It may be appreciated that the examples described below are not intended to be limiting, and that in embodiments of the present invention the parameters used in the examples may be different.

Figure 2A:
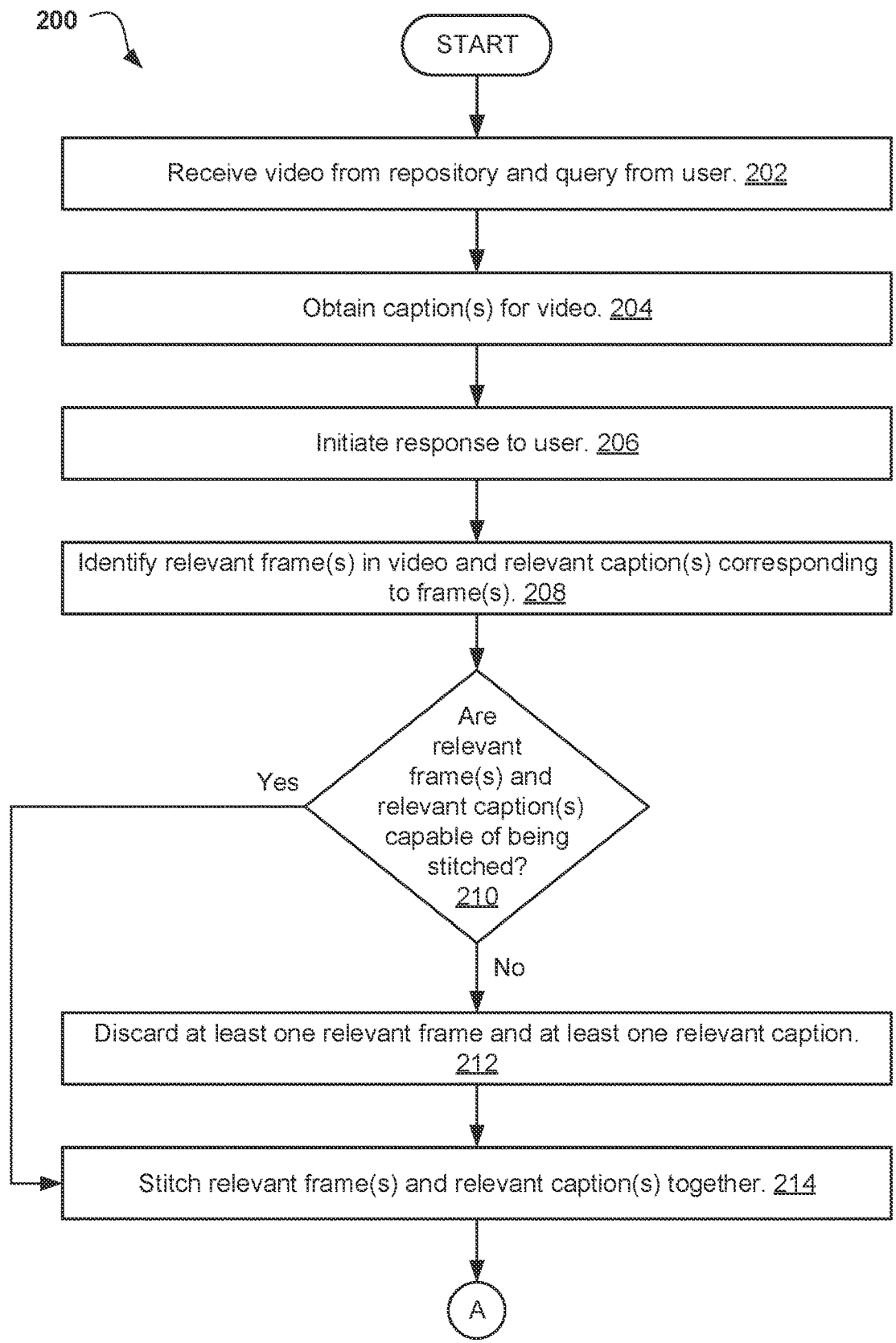
FIGS. 2A and 2B illustrate an operational flowchart for query-based synthesis of a contextual video frame summary through partial attention in a contextual video synthesis process according to at least one embodiment.
Figure 2B:
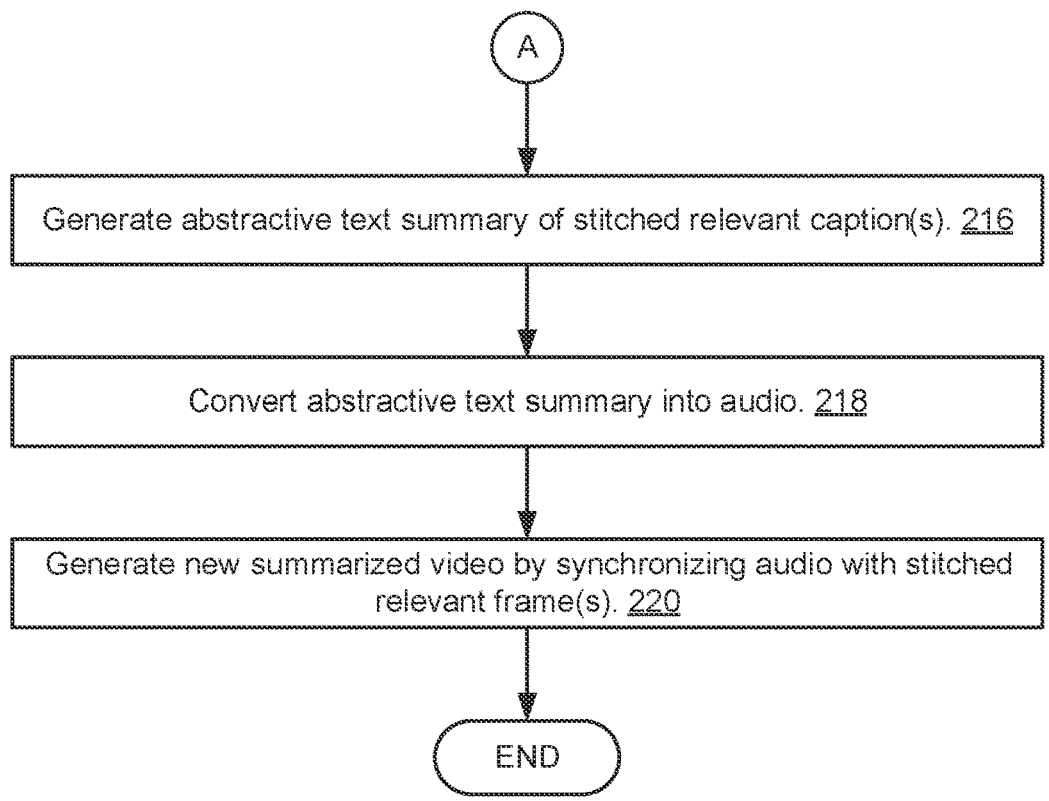

Referring now to FIGS. 2A and 2B, an operational flowchart for query-based synthesis of a contextual video frame summary through partial attention in a contextual video synthesis process 200 is depicted according to at least one embodiment. At 202, the contextual video synthesis program 150 receives the video from the repository and the query from the user. The video may be of an activity and may include multiple frames. The repository may be a database, such as remote database 130, containing a plethora of videos on a variety of topics.

Examples of the user may include, but are not limited to, work center employees who respond to customers on a daily basis, students/researchers who are interested in learning topics from a specific field of interest, and/or common internet users who are looking for specific information from a video. The query may be in the form of a question or in the form of one or more keywords. For example, the query may be "I want to learn more about machine learning." Alternatively, the query may be "Can you tell me more about machine learning?" In another example, the query may be "I want to learn how to drive" or "Can you tell me how to drive?"

Then, at 204, the contextual video synthesis program 150 obtains the one or more captions for the video. The one or more captions may be a set of words corresponding to the video. According to at least one embodiment, the one or more captions may already exist in the video repository, in which the contextual video synthesis program 150 may simply fetch the one or more captions. According to at least one other embodiment, the one or more captions may not exist in the video repository, in which the contextual video synthesis program 150 may proceed to generate the one or more captions, described in further detail below.

According to at least one embodiment, where the one or more captions do not exist, the one or more captions generated may include one or more audio captions. The one or more audio captions may transcribe the audio in the video to text. For example, any spoken dialog in the video may be transcribed into textual form. An automatic speech recognition system may be utilized to convert the audio to text and store the output as the one or more audio captions.

According to at least one other embodiment, where the one or more captions do not exist, the one or more captions generated may include one or more video captions. The one or more video captions may be generated based on an action performed in one or more frames of the video. The one or more frames may be input into a convolutional neural network (CNN) which produces frame-level feature representations. The frame-level feature representations may be fed into an encoder of a long short-term memory (LSTM) model to generate a video representation that acts as the initial hidden state in a decoder of the LSTM model. During the decoding process, a one-hot vector (e.g., 0 or 1) is passed through an embedding layer to the decoder of the LSTM model to generate a probability distribution of a word (e.g., a caption) at one or more time-steps. The word with the highest probability may be selected as the final output for the one or more time-steps and stored separately as the one or more video captions. For example, in a video showing a car driving along a roadway, the action of a passenger sitting in a seat and then getting out of the car may not be spoken, but may nevertheless be transcribed as "I sat in the passenger seat" and "I got out of the car."

Next, at 206, the contextual video synthesis program 150 initiates the response to the user. The initiated response may be customized based on a status of the query. A combination of a supervised trained machine learning model and a LSTM model may determine the phrasing to initiate the response to the user. The status of the query may be whether the query is a new query or a follow-up from a previous query.

According to at least one embodiment, when the query is the new query, the supervised trained machine learning model may begin an automated response with a greeting to the user. For example, the greeting may be, "Thank you for your question" or "Welcome to customer support."

According to at least one other embodiment, when the query is the follow-up from the previous query, the LSTM model may begin the automated response with a reference to the previous query. For example, the reference may be, "Thank you for following up from the previous query."

Then, at 208, the contextual video synthesis program 150 identifies the one or more relevant frames in the video and the one or more relevant captions corresponding to the one or more relevant frames. The one or more relevant frames and the one or more relevant captions are identified based on the query. It may be appreciated that in embodiments of the present invention, the term "relevant" means those frames and/or captions that are relevant to the context of the query. The query may be fed to an attention based bidirectional LSTM encoder-decoder model that identifies the one or more relevant frames and the one or more relevant captions corresponding to those relevant frames.

According to at least one embodiment, the encoder recurrent neural network (RNN) may read the query word by word, encoding the words in a hidden state and passing the context forward. On a complete pass, the encoder may produce an encoding of the query (e.g., a vector) which may capture the context of the query. An attention layer may calculate the importance of each input encoding for the current word and assigns a higher weightage based on word importance. For example, where the query is "I want to learn more about machine learning," a higher weightage may be assigned to the encodings for "machine learning" and "more" than the encoding for "I" and/or "want." Then, the decoder may read the target sequence word-by-word and predicts the same sequence offset by one time-step. The decoder may be trained to predict the next word in the sequence based on the previous word. The decoder may emphasize the parts of the query that are most relevant for generating the next word based on the attention layer output. Continuing the example described above, where the higher weightage may be assigned to the encodings for "machine learning" and "more," then when decoded the one or more relevant frames and the one or more relevant captions may be those frames and corresponding captions that have references to the words "more" and "machine learning." The one or more relevant frames and the one or more relevant captions may then be extracted from the video.

According to at least one other embodiment, identifying the one or more relevant frames in the video may include incorporating one or more sequentially previous frames into the one or more relevant frames in response to determining the one or more relevant captions include a reference to the one or more sequentially previous frames. For example, where the one or more relevant frames and the one or more relevant captions are those frames and captions having references to the words "more" and "machine learning," and where those relevant frames and captions have a reference to one or more previous frames, then those one or more previous frames may be included in the one or more relevant frames. Continuing the example, a relevant frame may include the caption, "Machine learning is discussed earlier in the presentation at 2:20," then a previous frame corresponding to time stamp 2:20 may be included as one of the relevant frames.

Next, at 210, the contextual video synthesis program 150 determines whether the one or more relevant frames and the one or more relevant captions are capable of being stitched together.

According to at least one embodiment, in order to determine whether the one or more relevant captions are able to be stitched together, an RNN and a fully connected neural network (FCNN) may be utilized by the contextual video synthesis program 150. First, the extracted one or more relevant captions may be passed through the RNN to determine whether the given two sentences at each time-step are contextually related. For example, the captions for a relevant frame may be "I sat in the passenger seat," and the captions for another relevant frame may be "I got out of the car." These two sentences may be contextually related because they include actions within the context of an automobile. The contextually related captions may be stitched together and the next caption may be checked to determine whether the next caption can be stitched together with the current stitched captions. For example, where the next caption for a relevant frame is "I talk to my friend," this caption may not be contextually related to the current stitched captions because talking to a friend is not within the context of the automobile. Where the next caption is not related contextually, the FCNN with a softmax classifier may determine whether the given captions are able to be passed to the text summarizer or not. The decision is based on whether the given captions have any references to content outside of the given video. Where the given captions have references to content outside of the given video, the classifier may determine that the given captions cannot be stitched together and flags the captions as not able to be passed to the text summarizer. For example, the sentence "I talk to my friend" may not be stitched with the sentences "I sat in the passenger seat" and "I got out of the car." Contrarily, where the given captions have no references to content outside of the given video, the classifier may determine that the given captions can be stitched together and flags the captions as able to be passed to the text summarizer.

According to at least one embodiment, in order to determine whether the one or more relevant frames are able to be stitched together, a generative adversarial network (GAN) may be utilized by the contextual video synthesis program 150. In any GAN, the goal of the GAN generator is to trick the GAN discriminator into classifying artificially generated (i.e., fake) images and/or videos as real. In addition to feeding the output from the GAN generator into the GAN discriminator, the GAN discriminator is also fed training samples of stitched videos. The GAN discriminator may then output a number between 0 and 1, where 0 indicates the GAN discriminator classified the video as fake and 1 indicates the GAN discriminator classified the video as real. The two models are trained together in a zero-sum game (i.e., adversarial) until the GAN discriminator is fooled about half the time. The GAN generator may generate an initial summarized video that includes the one or more relevant frames. This initial summarized video may then be fed to the GAN discriminator. In response to the GAN discriminator determining that the initial summarized video is real, the one or more relevant frames included in the initial summarized video may be flagged as capable of being stitched together, and thus capable of being fed to the final video summarizer. The GAN generator may then stitch the next (i.e., successive) video frame with the previously generated video frames and feed the video to the GAN discriminator to determine whether the video with the successive relevant frame is real or fake. This process may continue for each successive relevant frame. In response to the GAN discriminator determining that the initial summarized video is fake, the one or more relevant frames included in the initial summarized video may be flagged as not capable of being stitched together, and thus not capable of being fed to the final video summarizer.

In response to determining the one or more relevant frames and the one or more relevant captions are not capable of being stitched together (step 210, "No" branch), the contextual video synthesis process 200 proceeds to step 212 to discard the at least one relevant frame and the at least one relevant caption that are not capable of being stitched together. In response to determining the one or more relevant frames and the one or more relevant captions are capable of being stitched together (step 210, "Yes" branch), the contextual video synthesis process 200 proceeds to step 214 to stitch the one or more relevant frames and the one or more relevant captions together.

Then, at 212, the contextual video synthesis program 150 discards the at least one relevant frame and the at least one relevant caption that are not capable of being stitched together. The relevant captions that are flagged as not able to be passed to the text summarizer may be discarded. For example, where the sentence "I talk to my friend" is flagged as not able to be passed to the text summarizer, "I talk to my friend" may be discarded. Additionally, the relevant frames that are flagged as not capable of being fed to the final video summarizer may also be discarded. For example, where the frame containing the captions "I talk to my friend" is classified as fake by the GAN discriminator, that frame may also be discarded.

Next, at 214, the contextual video synthesis program 150 stitches the one or more relevant frames and the one or more relevant captions together. The one or more relevant frames and the one or more relevant captions may be stitched together using known techniques. It may be appreciated that in embodiments where there is at least one relevant frame and at least one relevant caption that are not capable of being stitched together, the one or more relevant frames and the one or more relevant captions may be stitched together while omitting the discarded at least one relevant frame and the discarded at least one relevant caption. For example, the discarded sentence "I talk to my friend" may not be stitched with the sentences "I sat in the passenger seat" and "I got out of the car." Continuing the example, the discarded frame containing the captions "I talk to my friend" may not be stitched with the other one or more relevant frames.

Then, at 216, the contextual video synthesis program 150 generates the abstractive text summary of the stitched one or more relevant captions. The stitched one or more relevant captions may be fed to a contextual text summarizer, which may be an RNN-based encoder-decoder framework with an attention model that outputs the abstractive text summary. The encoder may read a sequence of input tokens X (i.e., the stitched captions) and converts the input into a sequence of hidden states. The hidden states may be passed to the attention layer which computes the attention distribution of the input tokens X. For example, where the stitched one or more relevant captions include the terms "more" and "machine learning," the attention distribution may give "more" a weight of 6 and "machine learning" a weight of 9 on a scale between 0 and 1.

The encoded representations may then be fed to the decoder to produce a sequence of target tokens, focusing on portions of the stitched one or more relevant captions having a higher weightage at each decoding step. The output of the decoder may be the abstractive text summary of the stitched one or more relevant captions.

Next, at 218, the contextual video synthesis program 150 converts the abstractive text summary into the audio. The actual voice attributes of the video may be collected, and a text-to-speech synthesizer may be utilized to convert the summarized text described above with respect to step 216 into the audio.

According to at least one embodiment, a voice transfer model may generate a personalized voice for the video. For example, the personalized voice may be that of a single speaker selected from two or more speakers.

Then, at 220, the contextual video synthesis program 150 generates the new summarized video. The new summarized video is generated by synchronizing the audio with the stitched one or more relevant frames. The stitched one or more relevant frames and the stitched one or more relevant captions may be fed to the GAN to generate the new summarized video. The new summarized video may be an abbreviated version of the original video that focuses on topics related to the query. For example, where the query is "I want to learn more about machine learning," the new summarized video generated by the GAN may only include those stitched one or more relevant frames and stitched one or more relevant captions that discuss machine learning while excluding other non-relevant portions of the original video. The generated new summarized video may be a lip-synced summarized video, such that the audio is presented along with lip movements of one or more speakers in the new summarized video.

According to at least one embodiment, after initiating the response to the user as described above with respect to step 206, the GAN may continue to provide the new summarized video to the user based on the query. For example, the GAN may provide the new summarized video the user after an initial greeting of "Thank you for your question" or "Welcome to customer support."

It may be appreciated that FIGS. 2A and 2B provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of query-based synthesis of a contextual video frame summary through partial attention, the method comprising:
receiving a video from a repository and a query from a user including one or more keywords regarding an item of content;
obtaining one or more captions for the video;
identifying one or more relevant frames in the video and one or more relevant captions corresponding to the one or more relevant frames based on the query, wherein the query is fed to an attention based bidirectional long short-term memory encoder-decoder (LSTM) model to identify the one or more relevant frames and the one or more relevant captions;
determining whether the one or more relevant frames are capable of being stitched together and the one or more relevant captions are capable of being stitched together;
in response to determining the one or more relevant frames are capable of being stitched together and the one or more relevant captions are capable of being stitched together, stitching the one or more relevant frames together and the one or more relevant captions together;
generating an abstractive text summary of the stitched one or more relevant captions;
converting the abstractive text summary into audio; and
generating a new summarized video by synchronizing the audio with the stitched one or more relevant frames.

2. The computer-based method of claim 1, further comprising:
in response to determining the one or more relevant frames and the one or more relevant captions are not capable of being stitched together:
discarding at least one relevant frame and at least one relevant caption that are not capable of being stitched together; and
stitching the one or more relevant frames and the one or more relevant captions together while omitting the discarded at least one relevant frame and the discarded at least one relevant caption.

3. The computer-based method of claim 2, further comprising:
initiating a response to the user, wherein the initiated response is customized based on a status of the query.

4. The computer-based method of claim 2, wherein identifying the one or more relevant frames in the video further comprises:
incorporating one or more sequentially previous frames into the one or more relevant frames in response to determining the one or more relevant captions include a reference to the one or more sequentially previous frames.

5. The computer-based method of claim 2, wherein obtaining the one or more captions for the video further comprises:
generating one or more video captions based on an action performed in one or more frames of the video.

6. The computer-based method of claim 2, wherein generating the new summarized video further comprises:
generating, by a generative adversarial network (GAN) generator, a lip-synced summarized video.

7. The computer-based method of claim 2, wherein determining whether the one or more relevant frames are capable of being stitched together further comprises:
generating, by a generative adversarial network (GAN) generator, an initial summarized video including the one or more relevant frames; and
in response to determining, by a GAN discriminator, that the initial summarized video is real, flagging the one or more relevant frames included in the initial summarized video as capable of being stitched together.

8. A computer system, the computer system comprising:
one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
receiving a video from a repository and a query from a user including one or more keywords regarding an item of content;
obtaining one or more captions for the video;
identifying one or more relevant frames in the video and one or more relevant captions corresponding to the one or more relevant frames based on the query, wherein the query is fed to an attention based bidirectional long short-term memory encoder-decoder (LSTM) model to identify the one or more relevant frames and the one or more relevant captions;
determining whether the one or more relevant frames are capable of being stitched together and the one or more relevant captions are capable of being stitched together;
in response to determining the one or more relevant frames are capable of being stitched together and the one or more relevant captions are capable of being stitched together, stitching the one or more relevant frames together and the one or more relevant captions together;
generating an abstractive text summary of the stitched one or more relevant captions;
converting the abstractive text summary into audio; and
generating a new summarized video by synchronizing the audio with the stitched one or more relevant frames.

9. The computer system of claim 8, the method further comprising:
in response to determining the one or more relevant frames and the one or more relevant captions are not capable of being stitched together:
discarding at least one relevant frame and at least one relevant caption that are not capable of being stitched together; and
stitching the one or more relevant frames and the one or more relevant captions together while omitting the discarded at least one relevant frame and the discarded at least one relevant caption.

10. The computer system of claim 9, the method further comprising:
initiating a response to the user, wherein the initiated response is customized based on a status of the query.

11. The computer system of claim 9, wherein identifying the one or more relevant frames in the video further comprises:
incorporating one or more sequentially previous frames into the one or more relevant frames in response to determining the one or more relevant captions include a reference to the one or more sequentially previous frames.

12. The computer system of claim 9, wherein obtaining the one or more captions for the video further comprises:
generating one or more video captions based on an action performed in one or more frames of the video.

13. The computer system of claim 9, wherein generating the new summarized video further comprises:
generating, by a generative adversarial network (GAN) generator, a lip-synced summarized video.

14. The computer system of claim 9, wherein determining whether the one or more relevant frames are capable of being stitched together further comprises:
generating, by a generative adversarial network (GAN) generator, an initial summarized video including the one or more relevant frames; and
in response to determining, by a GAN discriminator, that the initial summarized video is real, flagging the one or more relevant frames included in the initial summarized video as capable of being stitched together.

15. A computer program product, the computer program product comprising:
one or more computer-readable tangible storage medium and program instructions stored on at least one of the one or more computer-readable tangible storage medium, the program instructions executable by a processor capable of performing a method, the method comprising:
receiving a video from a repository and a query from a user including one or more keywords regarding an item of content;
obtaining one or more captions for the video;
identifying one or more relevant frames in the video and one or more relevant captions corresponding to the one or more relevant frames based on the query, wherein the query is fed to an attention based bidirectional long short-term memory encoder-decoder (LSTM) model to identify the one or more relevant frames and the one or more relevant captions;
determining whether the one or more relevant frames are capable of being stitched together and the one or more relevant captions are capable of being stitched together;
in response to determining the one or more relevant frames are capable of being stitched together and the one or more relevant captions are capable of being stitched together, stitching the one or more relevant frames together and the one or more relevant captions together;
generating an abstractive text summary of the stitched one or more relevant captions;
converting the abstractive text summary into audio; and
generating a new summarized video by synchronizing the audio with the stitched one or more relevant frames.

16. The computer program product of claim 15, the method further comprising:
in response to determining the one or more relevant frames and the one or more relevant captions are not capable of being stitched together:
discarding at least one relevant frame and at least one relevant caption that are not capable of being stitched together; and
stitching the one or more relevant frames and the one or more relevant captions together while omitting the discarded at least one relevant frame and the discarded at least one relevant caption.

17. The computer program product of claim 16, the method further comprising:
initiating a response to the user, wherein the initiated response is customized based on a status of the query.

18. The computer program product of claim 16, wherein identifying the one or more relevant frames in the video further comprises:
incorporating one or more sequentially previous frames into the one or more relevant frames in response to determining the one or more relevant captions include a reference to the one or more sequentially previous frames.

19. The computer program product of claim 16, wherein obtaining the one or more captions for the video further comprises:
generating one or more video captions based on an action performed in one or more frames of the video.

20. The computer program product of claim 16, wherein generating the new summarized video further comprises:
generating, by a generative adversarial network (GAN) generator, a lip-synced summarized video.

* * * * *